United States Patent
Eller et al.

(10) Patent No.: US 9,328,701 B2
(45) Date of Patent: May 3, 2016

(54) FUEL VAPORIZER

(71) Applicant: BorgWarner Ludwigsburg GmbH, Ludwigsburg (DE)

(72) Inventors: Martin Eller, Ludwigsburg (DE); Nicolaus Wulff, Stuttgart (DE); Eric Hein, Neustadt-Diedesfeld (DE); Tobias Inclan, Wissembourg (FR)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 0 days.

(21) Appl. No.: 14/457,587

(22) Filed: Aug. 12, 2014

(65) Prior Publication Data

US 2015/0047616 A1 Feb. 19, 2015

(30) Foreign Application Priority Data

Aug. 14, 2013 (DE) .......................... 10 2013 108 815
Oct. 21, 2013 (DE) .......................... 10 2013 111 589

(51) Int. Cl.
| | |
|---|---|
| *F02G 5/00* | (2006.01) |
| *F02M 31/18* | (2006.01) |
| *F01N 3/025* | (2006.01) |
| *F01N 3/36* | (2006.01) |
| *F01N 13/16* | (2010.01) |
| *F02M 27/02* | (2006.01) |
| *F02B 3/06* | (2006.01) |
| *F02B 1/04* | (2006.01) |

(52) U.S. Cl.
CPC .............. *F02M 31/18* (2013.01); *F01N 3/025* (2013.01); *F01N 3/0253* (2013.01); *F01N 3/36* (2013.01); *F01N 13/16* (2013.01); *F01N 2450/16* (2013.01); *F01N 2610/03* (2013.01); *F01N 2610/107* (2013.01); *F01N 2610/14* (2013.01); *F02B 1/04* (2013.01); *F02B 3/06* (2013.01); *F02B 2275/14* (2013.01); *F02M 27/02* (2013.01)

(58) Field of Classification Search
CPC ............ F02M 31/18; F02M 7/02; F02B 1/04; F02B 3/06; F02B 2275/14
USPC ......................................................... 123/558
See application file for complete search history.

(56) References Cited

U.S. PATENT DOCUMENTS

| | | | | |
|---|---|---|---|---|
| 5,685,680 | A | * | 11/1997 | Duffy et al. .................... 411/171 |
| 5,873,354 | A | * | 2/1999 | Krohn et al. .................. 123/549 |
| 6,527,304 | B1 | | 3/2003 | Pliassounov |
| 2012/0117955 | A1 | | 5/2012 | Eller |

FOREIGN PATENT DOCUMENTS

DE        10 2009 013 664 A1    10/2010

* cited by examiner

*Primary Examiner* — Lindsay Low
*Assistant Examiner* — Charles Brauch
(74) *Attorney, Agent, or Firm* — Bose McKinney & Evans LLP

(57) ABSTRACT

What is described is a fuel vaporizer comprising a housing which comprises an inlet opening with an internal thread, an inlet tube which is seated in the inlet opening. According to this disclosure, it is provided that the inlet tube comprises an undercut head and the inlet tube protrudes through a bushing the inside diameter of which is smaller than the outside diameter of the head, wherein the bushing comprises an external thread with which it is screwed into the inlet opening of the housing. What is additionally described is a kit for the production of a fuel vaporizer.

19 Claims, 2 Drawing Sheets

FUEL VAPORIZER

RELATED APPLICATIONS

This application claims priority to DE 10 2013 108 815.5, filed Aug. 14, 2013, and DE 10 2013 111 589.6, filed Oct. 21, 2013, both of which are hereby incorporated herein by reference in their entireties.

BACKGROUND

The invention relates to a fuel vaporizer such as are generally known from DE 10 2009 013 664 A1.

Fuel vaporizers are used in the exhaust gas system of motor vehicles featuring catalytic converters for exhaust gas treatment and/or particle filters. Particle filters can remove particles from the exhaust gas by absorbing and storing them. Such particle filters must be cleaned at regular intervals. To achieve this, the exhaust gas temperature is raised to about 600° C. in order to burn the particles/soot. The high temperature is generated by conducting vaporized fuel into the exhaust gas which is converted into thermal energy through an exothermic reaction by means of an oxidation catalytic converter.

Fuel vaporizers and connected lines are subject to high stresses. Typically, the housing of a fuel vaporizer reaches temperatures of up to 400° C. during operation. Splash and spray water can produce temperature shocks. In addition, there are vibrations caused by vehicle operation.

For these reasons, it is problematic to connect lines reliably to the housing of fuel vaporizers. Tubes can be screwed into the inlet openings of a vaporizer housing but there is the risk that such a screw connection may come loose under unfavorable conditions, for example, when splash and spray water cause a temperature shock at high temperatures and, at the same time, strong vibrations are caused by vehicle operation. An alternative to screw connections are welded or soldered connections which, however, are disadvantageous in that they cannot be disconnected for maintenance purposes or can be disconnected for such purposes with great effort and difficulties only.

SUMMARY

This disclosure teaches a disconnectable and yet reliable connection that can be created between the housing of a fuel vaporizer and an inlet tube.

According to this disclosure, the inlet tube is held in the inlet opening of the housing by means of a bushing which comprises an external thread and is screwed into the inlet opening. The inlet tube protrudes through the bushing and has an undercut head which is seated in the housing of the fuel vaporizer. The outside diameter of the head exceeds the inside diameter of the bushing in size, with the result that the tube cannot be pulled out of the bushing. In this manner, the bushing can form a clamping screw which holds the tube in the housing by applying pressure to the undercut head.

If the inlet tube is cooled down abruptly by spray water, this does not have any effect on the screw connection. Even if the tube is thermally contracted by such cooling down, it is still safely held in the housing of the fuel vaporizer by means of the bushing. An abrupt cooling down of the housing by splash or spray water is likewise harmless because a thermal contraction of the housing only results in the fact that the bushing is seated in the housing even more firmly. Over a large part of its length, the bushing is disposed in the housing and is therefore protected against temperature shocks. If splash or spray water occurs, the section of the housing that surrounds the bushing advantageously acts as a heat reservoir, with the result that rapid changes in temperature of the bushing are prevented. Thus, these teachings result in the joint being protected from effects of spray water.

An advantageous refinement of this disclosure provides that a spring is arranged between the bushing and the undercut head. In this manner, a bias can be ensured and the screwed connection be secured even in case of thermal expansions and vibrations. For example, the spring can be a corrugated ring spring.

A further advantageous refinement of this disclosure provides that the bushing and the housing are made of materials having different thermal expansion coefficients. In this manner, the screw connection can be prevented from coming loose due to thermal expansion. For example, the bushing may be made of a material that has a thermal expansion coefficient which is larger than that of the housing. If the housing and the bushing heat up, the screw connection becomes even more firm due to the different thermal expansion coefficients. For example, austenitic steel and ferrite steel can be used as materials having different thermal expansion coefficients.

A further advantageous refinement of this disclosure provides that the external thread of the bushing is completely arranged in the housing. In this manner, the part of the bushing that is critical in terms of the screw connection is well protected against spray water in the housing.

A further advantageous refinement of this disclosure provides that the external thread and/or the internal thread are coated, for example, with a lubricant. In this manner, it is possible to specify a defined frictional coefficient and to ensure an optimal tightening torque of the screw connection.

A further advantageous refinement of this disclosure provides that the bushing is surrounded by the housing over a large part of its length. In this case, spray or splash water can produce a temperature shock to a small part of the bushing only. A sudden cooling down of the complete bushing and an impairment of the screw connection are thereby even more improbable. Preferably, the bushing is surrounded by the housing over more than three quarters of its length.

A further advantageous refinement of this disclosure provides that the bushing comprises a hexagonal section in order to facilitate applying torque.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
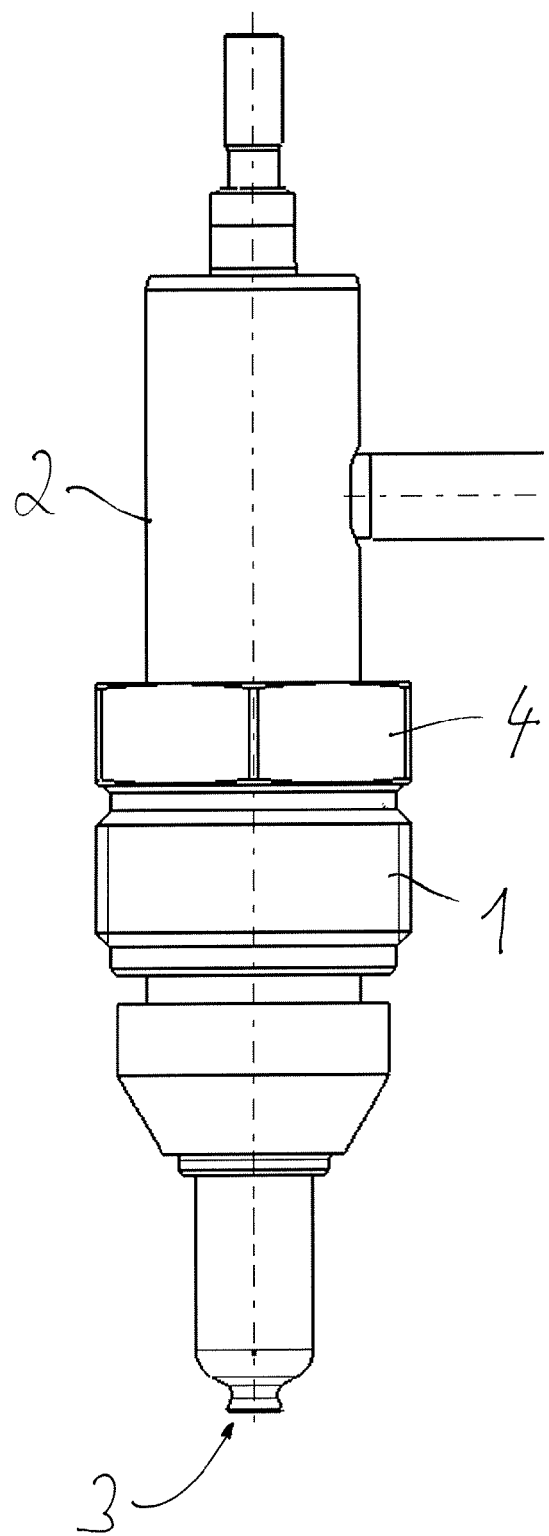
FIG. 1 shows a fuel vaporizer.

The fuel vaporizer shown in FIG. 1 has a housing 1 and an inlet tube 2 through which fuel to be vaporized is introduced into the housing 1. An electrical heater element, which is not illustrated, is arranged in the housing 1. Vaporized fuel flows out of an outlet opening 3 of the housing 1. The inlet tube 2 is connected to the housing 1 by means of a bushing 4. Potential embodiments of how the inlet tube 2 can be held by means of the bushing 4 are shown in FIGS. 2 and 3.

Figure 2:
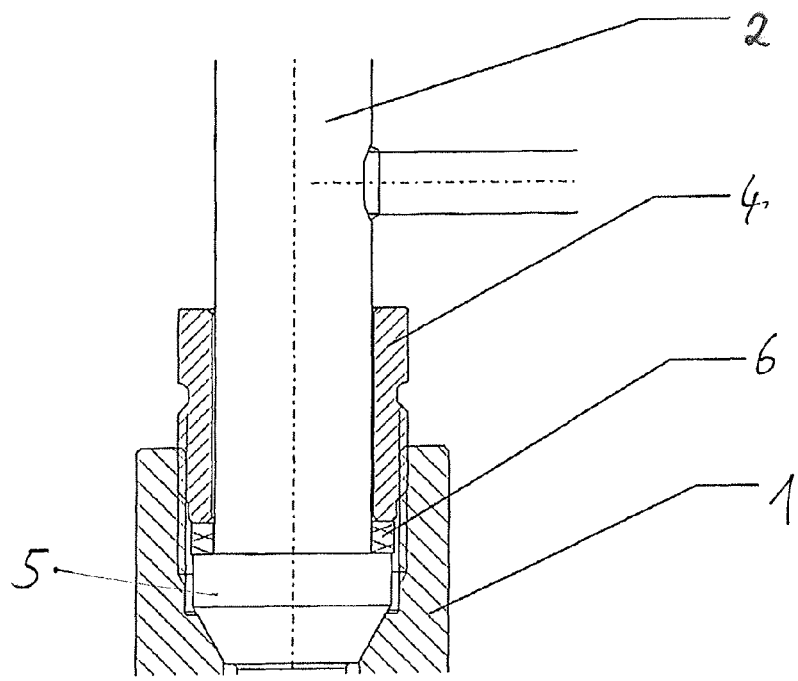
FIG. 2 is a sectional detail view of a fuel vaporizer.
Figure 3:
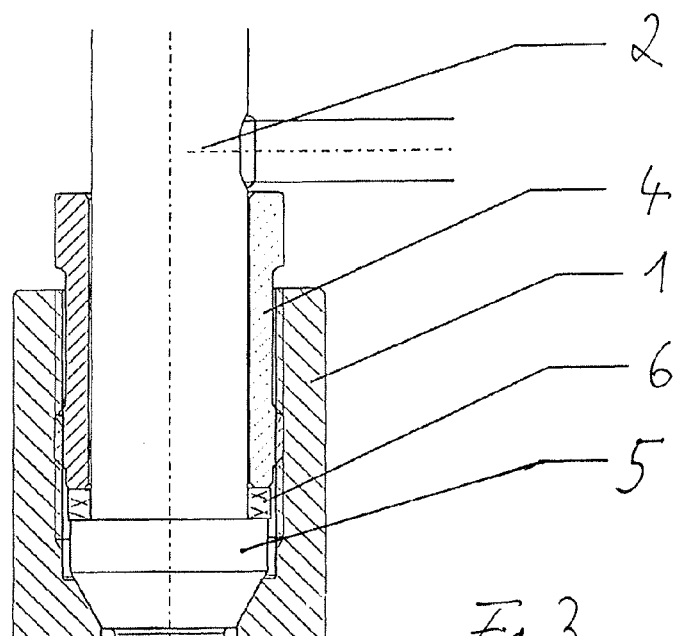
FIG. 3 is a sectional detail view of a further exemplary embodiment.

FIG. 2 is a sectional view of the connection of the housing 1 of a fuel vaporizer and the inlet tube 2. The housing 1 has an inlet opening with an internal thread. The inlet tube 2 is inserted in this inlet opening and is held there by a bushing 4 which is screwed into the inlet opening. The bushing 4 has an external thread that matches the internal thread of the inlet opening of the housing 1. The internal and/or external threads can be coated, for example with a lubricant, in order to ensure a defined tightening torque. Outside the housing 1, the bushing 4 has a hexagonal section in order to facilitate screwing it in.

The inlet tube 2 protrudes through the bushing 4 and has an undercut head 5 the outside diameter of which exceeds the inside diameter of the bushing 4 in size. A ring spring 6, for example a multi-layer corrugated ring spring, is arranged between the head 5 and the bushing 4. Instead of a ring spring some other ring may be used to secure the screw connection. Suitable rings are sometimes called lock washers or safety disks.

The head 5 has a conically tapering sealing surface which abuts against a truncated inner surface of the housing 1. In this manner, the housing 1 and the head 5 form a seal seat.

The housing 1 and the bushing 4 can be made of materials with different thermal expansion coefficients, for example, austenitic steel and ferrite steel.

FIG. 3 is a sectional view of a further embodiment of the connection of the housing 1 of a fuel vaporizer and the inlet tube 2. This embodiment only differs from the other embodiment in the configuration of the bushing 4. That is to say that the bushing 4 is seated in the housing 1 over the largest part of its length. Due to the fact that the bushing 4 is surrounded by the housing 1 over the largest part of its length, improved protection against splash and spray water as well as against temperature shocks associated therewith is achieved.

The external thread of the bushing 4 ends at such a far distance from the hexagonal section that the external thread of the bushing 4 is completely arranged in the housing 1. In this manner, the thread is extremely well protected against environmental influences.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE SYMBOLS

1 Housing
2 Inlet tube
3 Outlet opening
4 Bushing
5 Head of inlet tube 2
6 Spring

What is claimed is:

1. A fuel vaporizer, comprising:
a housing comprising an inlet opening with an internal thread;
an inlet tube seated in the inlet opening, the inlet tube comprising an undercut head;
a bushing through which the inlet tube protrudes, the inside diameter of the bushing being smaller than the outside diameter of the head; and
the bushing comprising an external thread with which the bushing is screwed into the inlet opening of the housing, wherein tightening the bushing moves the bushing toward the undercut head to secure the inlet tube in the inlet opening.

2. The fuel vaporizer according to claim 1, wherein a ring is arranged between the bushing and the undercut head.

3. The fuel vaporizer according to claim 1, wherein a spring is arranged between the bushing and the undercut head.

4. The fuel vaporizer according to claim 3, wherein the spring is a corrugated ring spring.

5. The fuel vaporizer according to claim 1, wherein the head comprises a conically tapering sealing surface which abuts against a truncated inner surface of the housing.

6. The fuel vaporizer according to claim 1, wherein the bushing and the housing are formed of materials having different thermal expansion coefficients.

7. The fuel vaporizer according to claim 1, wherein the housing is made of one of austenitic steel or ferrite steel and the bushing is made of the other of austenitic steel or ferrite steel.

8. The fuel vaporizer according to claim 1, wherein the bushing projects from the housing and wherein the external thread of the bushing is only arranged on a section of the bushing that is completely seated in the housing.

9. The fuel vaporizer according to claim 1, wherein the external thread and/or the internal thread are coated.

10. The fuel vaporizer according to claim 1, wherein the bushing is surrounded by the housing over a largest part of its length.

11. A kit, comprising:
a housing of a fuel vaporizer, the housing comprising an inlet opening with an internal thread;
an inlet tube which comprises an undercut head; and
a bushing which comprises an external thread matching the internal thread;
wherein the inside diameter of the bushing is smaller than the outside diameter of the head and larger than the outside diameter of a section of the inlet tube, said section being arranged adjacent to the head;
further wherein the housing is made of austenitic steel or ferrite steel, and wherein the bushing is made of ferrite steel if the housing is made of austenitic steel or the bushing is made of austenitic steel if the housing is made of ferrite steel.

12. The kit according to claim 11, wherein a lock washer is arranged between the bushing and the head.

13. The kit according to claim 11, wherein a safety disk is arranged between the bushing and the head.

14. A fuel vaporizer, comprising:
a housing comprising an inlet opening with an internal thread;
an inlet tube seated in the inlet opening, the inlet tube comprising an undercut head;
a bushing through which the inlet tube protrudes, the inside diameter of the bushing being smaller than the outside diameter of the head;
the bushing comprising an external thread with which the bushing is screwed into the inlet opening of the housing; and
a lock washer arranged between the bushing and the undercut head.

15. The fuel vaporizer according to claim 14, wherein tightening the bushing moves the bushing toward the undercut head to secure the inlet tube in the inlet opening.

16. The fuel vaporizer according to claim 14, wherein the head comprises a conically tapering sealing surface which abuts against a truncated inner surface of the housing.

17. A fuel vaporizer, comprising:
- a housing comprising an inlet opening with an internal thread;
- an inlet tube seated in the inlet opening, the inlet tube comprising an undercut head;
- a bushing through which the inlet tube protrudes, the inside diameter of the bushing being smaller than the outside diameter of the head;
- the bushing comprising an external thread with which the bushing is screwed into the inlet opening of the housing; and
- a safety disk arranged between the bushing and the undercut head.

18. The fuel vaporizer according to claim 17, wherein tightening the bushing moves the bushing toward the undercut head to secure the inlet tube in the inlet opening.

19. The fuel vaporizer according to claim 17, wherein the head comprises a conically tapering sealing surface which abuts against a truncated inner surface of the housing.

\* \* \* \* \*